Nov. 18, 1958     J. A. STARK     2,860,495
FLEXIBLE COUPLINGS
Filed June 7, 1955
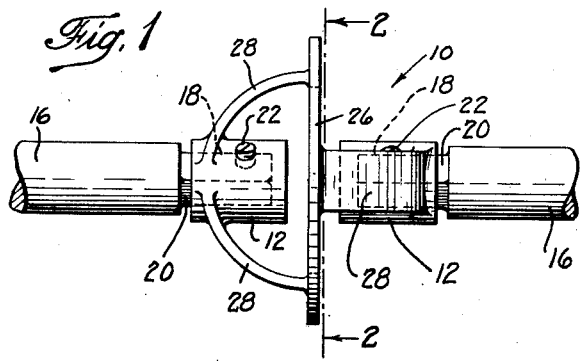
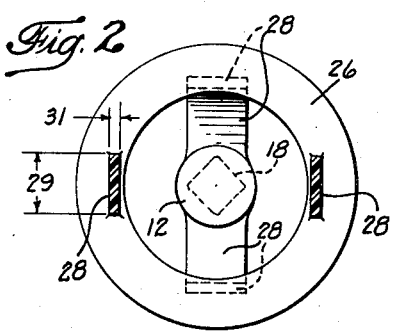
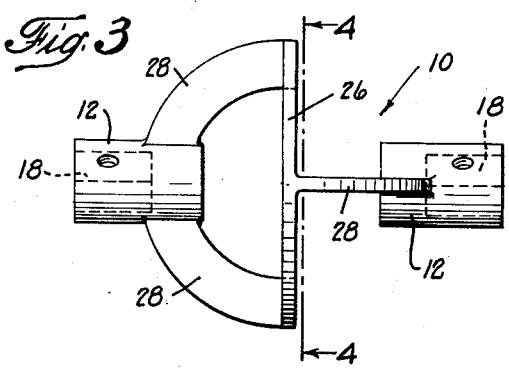
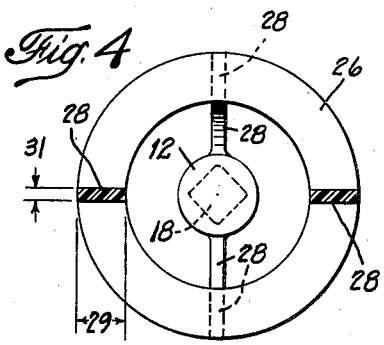
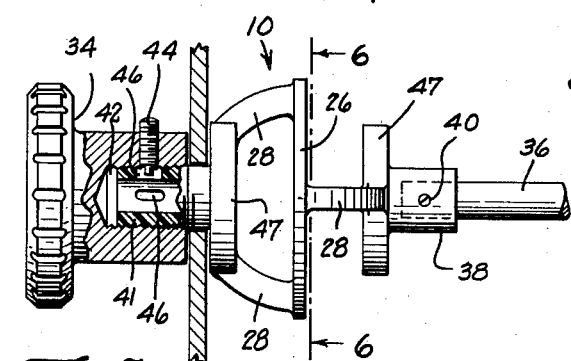
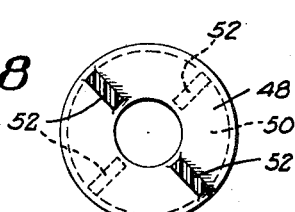
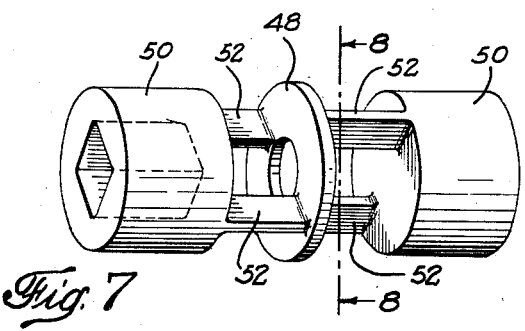
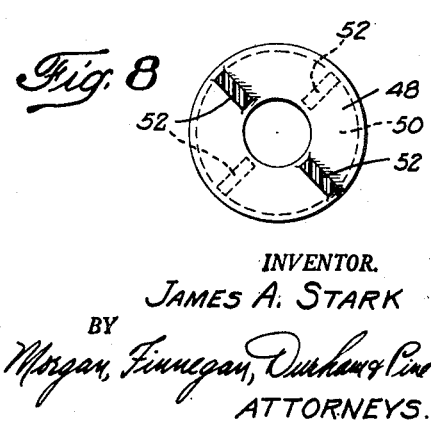
INVENTOR.
JAMES A. STARK
BY
Morgan, Finnegan, Durham & Pine
ATTORNEYS.

United States Patent Office 2,860,495
Patented Nov. 18, 1958

2,860,495

FLEXIBLE COUPLINGS

James A. Stark, Western Springs, Ill., assignor to John B. Thomson, Plandome, N. Y.

Application June 7, 1955, Serial No. 513,775

4 Claims. (Cl. 64—11)

The invention relates to flexible couplings for joining the ends of rotatable shafts which are subject to axial misalignment.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention and together with the description, serve to explain the principles of the invention.

The invention has for its object the provision of a small, lightweight, but tough flexible coupling, or universal joint, so constructed, as to be inexpensive to produce, readily adaptable to manufacture by injection molding and having greater relative structural strength than presently known devices. Additionally the invention has for its object the provision of flexible coupling having no moving parts so as to avoid the necessity of lubrication and protection against grit and wear. More particularly, the invention has for its object the provision of a flexible coupling formed from a tough, resilient lightweight plastic material as a wholly integral member having the proper degree of rigidity to efficiently transmit torque from one rotary shaft to another and having sufficient flexibility to adequately compensate for misalignment in the shafts, whether displaced, out of line or shifted angularly.

Briefly and generally the applicant's invention comprises a tough, resilient plastic formed with means for coupling the piece to the ends of a pair of rotatable shafts. Intermediate of said means the plastic piece is shaped to form a member disposed at substantially right angles to the axes of the shafts, said member having an internal opening formed therein. The shaft-coupling means are joined to the intermediate member by connectors, and preferably by two sets of connectors, each set comprising two or more connectors, one for each shaft-coupling means. Each set of connectors is oppositely disposed with respect to the other set of connectors, that is, the connectors of one set are angularly spaced from the connectors of the other set and the two sets of connectors are joined to opposite sides of the intermediate member. To obtain the proper rigidity with the necessary flexibility the intermediate member is formed having a width considerably greater than its thickness thereby imparting rigidity to the member in its own plane and flexibility in a plane perpendicular to the plane of the member. The coupling is thus enabled to compensate for misalignment between shafts while efficiently transmitting rotational torque from one shaft to the other. Although any desired number of connectors may be used to connect the intermediate member to one of the shaft coupling means, in the preferred form of the invention the intermediate member is connected with the two shaft coupling means by two pairs of connectors, one pair connecting the intermediate member with one shaft coupling means, and the other pair connecting the other side of the intermediate member with the shaft coupling means for the other shaft. In the preferred form each pair of connectors is preferably of a general semi-circular shape, or otherwise bent, to increase the flexibility of the connectors.

Various flexible tough, wear-resistant plastic, and preferably thermoplastic, compositions are suitable for use in the universal joints of the present invention including the synthetic, linear, polyamide compositions (such as Du Pont's FM 10001 nylon, FM 3001 nylon, FM 3604 nylon and other nylons), polyethylene, tetrafluoroethylene, polystyrene, methyl methacrylate and the like. Such plastic flexible couplings have been found to possess many advantages over die cast or forged metal. They are lighter in weight and possess superior durability due to their ability to flex without setting up internal stresses. In addition the use of these plastics permits the coupling to be produced by injection molding—a quick and economical method of manufacture—hence they are less costly to produce. Another advantage arising from the integral molded constructions is increased strength. Because the entire coupling is preferably in one piece, instead of many pieces assembled together, individual points of wear and stress may be avoided at the junctions of the connectors with the annular ring and with the shaft-coupling means. Being stronger the coupling may also be smaller.

It will be understood that the foregoing general description and the following detailed description as well are exemplary and explanatory of the invention but are not restrictive thereof.

Of the drawings:

Figure 1 is a side elevational view of one form which the invention may take;

Figure 2 is a view taken along the lines 2—2 in Figure 1 looking in the direction of the arrows;

Figure 3 is a view similar to Figure 1 showing a slightly different form of the invention;

Figure 4 is a view taken along the lines 4—4 in Figure 3 looking in the direction of the arrows;

Figure 5 shows the invention applied to a control knob for an instrument panel;

Figure 6 is a view taken along the lines 6—6 in Figure 5 looking in the direction of the arrows;

Figure 7 is a perspective view of a modified form of the invention; and

Figure 8 is a view taken along the line 8—8 in Figure 7 looking in the direction of the arrows.

Referring now to the drawings and at first to Figure 1 there is shown the preferred and an illustrative form of the invention comprising an integral molded coupling, or universal joint 10 formed of tough resilient plastic, preferably Du Pont nylon FM 10001. The end portions 12 of the joint 10 are adapted to be coupled to the ends of the rotatable shafts 16 so as to be rotatable therewith. For this purpose each end portion 12 is provided with a rectangular recess 18 to receive the correspondingly shaped end portions 20 of the shafts 16. A set screw 22 in each end 12 securely binds the ends 20 in the recesses 18 so as to prevent withdrawal therefrom.

The central portion of the joint 10 is formed in the shape of an annular ring 26 disposed at substantially right angles to the axes of the shafts 16. This ring 26 is joined to each of the end portions 12 of the joint 10 by connectors 28. A set of connectors 28 is provided on each side of the ring 26 and are preferably shaped to form an approximately semi-circular structure lying substantially in one plane. To achieve the proper flexibility to compensate for axial misalignment of the shafts 16 and the proper rigidity to transmit the torque from one shaft to the other the annular ring 26 and the connectors 28 are formed with a surface width 29 considerably greater than their thickness 31 thereby permitting the ring to flex in a direction perpendicular to the plane of its surface while strengthening the connectors against bending in the direction of rotational torque. Additionally each set of connectors 28 is joined to the ring 26 so as to be angularly disposed to the other pair of connectors, that is, the connectors of one set are spaced substantially midway between the connectors of the other set. Thus in case each set of connectors comprises a pair of connectors, the connectors of one pair are arranged at right angles to those of the other pair on the other side of the ring 26. If greater flexibility of the connectors 28 is desired the connectors may be joined to the ring 26 with the narrow dimension in the direction of the rotary torque as shown in Figures 3 and 4.

A particular application for the applicant's invention is shown in Figures 5 and 6. There the joint 10 is applied between the control knob 34 and shaft 36. Accordingly shaft 36 is secured within the recess 38 by a set-screw 40. The opposite end 41 of the joint 10 is threaded so as to engage the internal threaded recess 42 in the knob 34. Another set-screw 44 secures the knob against rotation on the end 41 by engaging one of the openings 46 spaced about its periphery. Circular disc-like portions 47 are provided on the joint to serve as thrust bearings for preventing axial movement of the joint.

Another form of the invention is shown in Figures 7 and 8. In this form of the invention the annular ring 48 has approximately the same diameter as the shaft-coupling means 50. The connectors 52 are accordingly straight members. This form of the invention is particularly suitable for use where there is relatively little space available.

The invention in its broader aspects is not limited to the specific parts shown and described but departures may be made therefrom within the scope of the accompanying claims without departing from the principles of the invention and without sacrificing its chief advantages.

What is claimed is:
1. A flexible coupling comprising molded tough, resilient linear polyamide composition said piece having shaft-coupling means at each end, a centrally apertured member, and two sets of oppositely disposed substantially curved connectors joining the shaft-coupling means to the member, the connectors of each set being joined to the member between the points at which the connectors of the other set are joined to the member said connectors being of a length sufficient to permit substantial flexing.

2. A flexible coupling comprising an integral molded piece of a tough, resilient linear polyamide composition, said piece having shaft-coupling means at each end, an annular ring of substantially greater diameter than the shaft-coupling means intermediate of said means, and two pairs of oppositely disposed substantially semi-circular connectors joining the shaft-coupling means to the annular member, each pair of connectors being joined to the annular member at right angles to the other pair of connectors and being of sufficient length to permit substantial flexing.

3. A flexible coupling comprising an integral molded piece of tough resilient plastic formed to provide shaft-coupling means at each end having a torsionally rigid but otherwise flexible annular intermediate portion and two sets of oppositely disposed connectors for joining the shaft-coupling means with the intermediate portion, the connectors of each set being spaced on said intermediate portion between the connectors of the other set and of a length sufficient to permit substantial flexing.

4. A flexible coupling as set forth in claim 4 in which the intermediate portion of the coupling comprises a very thin annular ring so as to give flexibility to the ring in a direction perpendicular to the plane of its surface and which is connected on opposite sides with two pairs of connectors, the connectors of each pair of connectors being spaced substantially opposite one another.

References Cited in the file of this patent
UNITED STATES PATENTS

| | | |
|---|---|---|
| 1,653,899 | Goff | Dec. 27, 1927 |
| 2,699,656 | Anderson et al. | Jan. 18, 1955 |
| 2,721,457 | Moore | Oct. 25, 1955 |
| 2,792,694 | Merel | May 21, 1957 |

FOREIGN PATENTS

| | | |
|---|---|---|
| 352,392 | Germany | Apr. 26, 1922 |